(12) United States Patent
Wang et al.

(10) Patent No.: US 10,470,057 B2
(45) Date of Patent: Nov. 5, 2019

(54) CELL CLUSTERING METHOD, SPECTRUM OVERLAPPING MULTIPLEXING METHOD BASED ON METHOD, AND DEVICE THEREOF

(71) Applicant: Shanghai Research Center for Wireless Communications, Shanghai (CN)

(72) Inventors: Bi-yan Wang, Shanghai (CN); Hua-jun Wang, Shanghai (CN); Kai Li, Shanghai (CN); Yang Yang, Shanghai (CN); Hai-feng Wang, Shanghai (CN)

(73) Assignee: Shanghai Research Center for Wireless Communications, Shanghai (CN)

( * ) Notice: Subject to any disclaimer, the term of this patent is extended or adjusted under 35 U.S.C. 154(b) by 0 days.

(21) Appl. No.: 15/854,788

(22) Filed: Dec. 27, 2017

(65) Prior Publication Data

US 2019/0075471 A1    Mar. 7, 2019

(30) Foreign Application Priority Data

Sep. 5, 2017  (CN) .......................... 2017 1 0792877

(51) Int. Cl.
*H04W 16/32*    (2009.01)
*H04W 16/02*    (2009.01)
*H04W 72/04*    (2009.01)
*H04W 72/08*    (2009.01)

(52) U.S. Cl.
CPC ........... *H04W 16/32* (2013.01); *H04W 16/02* (2013.01); *H04W 72/042* (2013.01); *H04W 72/082* (2013.01)

(58) Field of Classification Search
CPC . H04W 16/32; H04W 72/082; H04W 72/042; H04W 16/02
See application file for complete search history.

(56) References Cited

U.S. PATENT DOCUMENTS

| | | | |
|---|---|---|---|
| 2013/0322235 A1* | 12/2013 | Khoryaev | H04W 24/10 370/229 |
| 2016/0056907 A1* | 2/2016 | Wei | H04W 72/1226 370/280 |
| 2017/0078981 A1* | 3/2017 | Tian | H04W 52/24 |
| 2017/0280467 A1* | 9/2017 | Zhu | H04W 72/0426 |

* cited by examiner

*Primary Examiner* — Phuc H Tran
(74) *Attorney, Agent, or Firm* — Mark M. Friedman

(57) ABSTRACT

The present invention discloses a cell clustering method, used to classify multiple small cells into N clusters and including the following steps: based on throughputs, respectively placing N small cells having a largest interference with each other into the N clusters to initialize the clusters; and based on the throughputs, separately adding a small cell having a smallest interference with the clusters into the clusters, and repeating the step until all the small cells are allocated into the clusters. The present invention further discloses a spectrum overlapping multiplexing method based on the cell clustering method. According to the present invention, the cell system average spectral efficiency and the cell edge spectral efficiency in an ultra dense network can be improved.

13 Claims, 4 Drawing Sheets

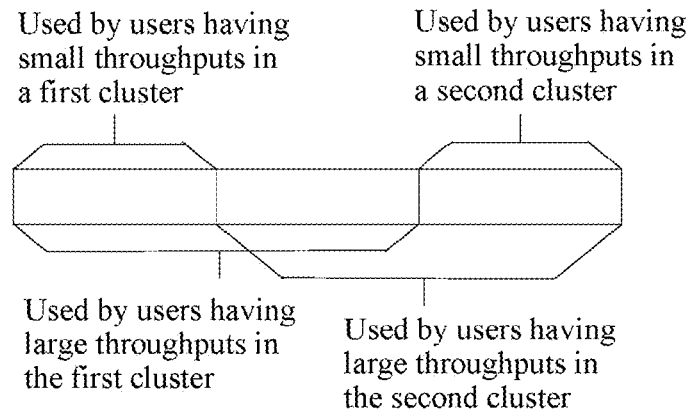
FIG. 3
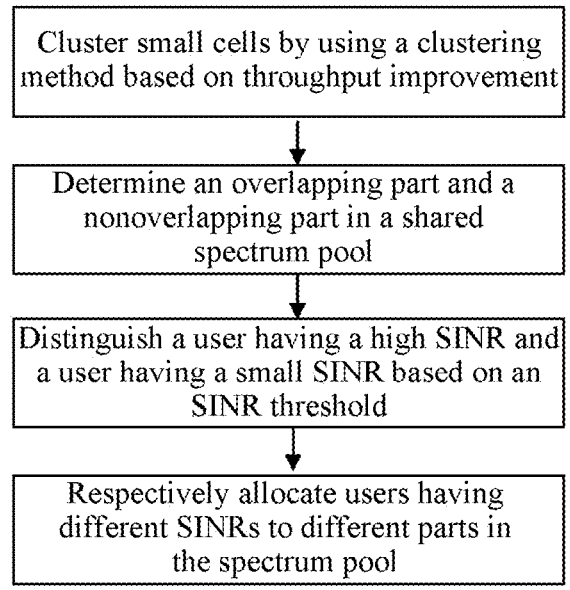
FIG. 4
| A | A+B | A+B+C | B+C | A+C | B | C |
FIG. 5

CELL CLUSTERING METHOD, SPECTRUM OVERLAPPING MULTIPLEXING METHOD BASED ON METHOD, AND DEVICE THEREOF

BACKGROUND

Technical Field

The present invention relates to a cell clustering method and a spectrum overlapping multiplexing method based on the cell clustering method, also relates to a communications device for performing the method, and belongs to the field of wireless communications technologies.

Related Art

Currently, see the following examples for common cell clustering methods.

Method 1: A Clustering Method Based on a Graph Theory

The method mainly includes using edges between nodes to represent interference, abstracting inference values as interference weights, and then performing clustering by drawing interference diagrams by using different methods. Some methods include decomposing sub-diagrams by using K-means, where each sub-diagram is used as a cluster. Some include setting a cell distance, a channel gain, and the like as similarities based on the similarities, so that cells having large similarities are classified into a cluster, and then inter-cluster interference management and intra-cluster resource scheduling are performed.

Method 2: A Clustering Method Based on a Smallest Interference

The quantity N of clusters is first determined. At first, each small cell is used as a cluster, and then interference between clusters is calculated according to the following formula. Afterwards, two clusters having a smallest interference between the two clusters are found and are merged into a large cluster. Then, iteration of the loop is performed until the quantity of clusters reaches the preset quantity N of clusters and all small cells are added into different clusters.

$$I(C_k, C_v) = \frac{1}{|C_k| + |C_v|} \sum_{\substack{i,j \in C_k, C_v \\ i \neq j}} P_{i,j}$$

$I(C_k, C_v)$ is an interference value between a cluster k and a cluster v. $|C_k|, |C_v|$ are respectively the quantities of cells in the cluster k and the cluster v. $P_{i,j}$ is interference receive power (an RSRP value) of $Cell_j$ to $Cell_i$ in the cluster k and the cluster v.

Method 3: A Clustering Method Based on Interference Reduction (a CCIR Method for Short)

The quantity N of clusters is first determined, and then a cell that is interfered to a largest extent is placed into a first cluster, to initialize the first cluster. Then, (N−1) cells having a largest interference with existing clusters are found in sequence to complete an initialization process of N clusters. Subsequently, a cell having a largest interference with all the existing clusters is found and added into an existing cluster having a smallest interference with the cell. Iteration of the loop is performed until all cells are added into the N clusters.

A calculation formula of interference of cells to clusters is as follows:

$$I(Cell_i, C_k) = \sum_{\substack{j \in C_k \\ RSRP_{i,j} \geq TH\_RSRP}} P_{j,i} \quad (1)$$

$I(Cell_i, C_k)$ is an interference value of a cell i to a cluster k, $P_{j,i}$ is interference receive power (an RSRP value) of $Cell_i$ to an element $Cell_j$ in the cluster k, and $Cell_j$ is an interference neighboring cell of $Cell_i$.

In the foregoing cell clustering methods, under an ultra dense networking condition, when the quantity of interference cells increases, and there is a relatively large quantity of cells in clusters in a later period of mergence of clusters, defects start to appear. For example, granularities of mergence of clusters are excessively large, and because only an average interference between clusters is considered, a strong interference between small cells in clusters cannot be eliminated and alleviated. In the CCIR method, only interference between cells is considered, and improvement of a network capacity and a network coverage level cannot be ensured.

SUMMARY

Technical problems to be resolved by the present invention are to provide a cell clustering method and also provide a spectrum overlapping multiplexing method based on the cell clustering method.

To achieve the foregoing inventive objectives, the present invention uses the following technical solutions:

According to a first aspect of embodiments of the present invention, a cell clustering method is provided, used to classify multiple cells into N clusters and including the following steps:

based on throughputs, placing a cell that is interfered to a smallest extent into a first cluster, and then respectively placing (N−1) cells that are interfered by existing clusters to a largest extent into (N−1) clusters to initialize the N clusters; and adding a cell that is interfered by the clusters to a smallest extent into the clusters, and repeating the step until all cells are allocated into the clusters, where N is a positive integer.

Preferably, the step of initializing the clusters includes the following steps:

traversing all the cells to find a cell having a largest throughput and placing the cell into the first cluster; and traversing the existing clusters, using the existing clusters as interference cells, finding a cell having a smallest throughput with the existing clusters, and adding the cell into a new cluster; repeating the step until all the clusters have an added cell.

Preferably, the cell having a largest throughput is obtained by calculation according to user level information; and the user level information includes micro cell transmit power, micro cell noise, a user assigned bandwidth, a user fairness coefficient, and a user channel gain.

Preferably, the user level information is sent by a micro cell to a macro cell by using a physical downlink control channel.

Preferably, the user level information is triggered when a user geographic location changes.

Preferably, the step of separately placing the cell having a smallest interference with the clusters into the clusters includes the following steps:

searching the remaining cells for a cell having a largest throughput with all the clusters and a corresponding cluster;

adding the cell having a largest throughput into the cluster; and repeating the foregoing steps until all the cells are added into the clusters.

According to a second aspect of the embodiments of the present invention, a spectrum overlapping multiplexing method based on the foregoing cell clustering method is provided, including the following steps:

determining an overlapping part and a nonoverlapping part in a spectrum capable of being used by the cells in the clusters;

determining a user having a large throughput and a user having a small throughput in the cells; and allocating the user having a small throughput to the nonoverlapping part.

Preferably, the spectrum overlapping multiplexing method further includes the following steps:

allocating a user having a largest throughput to a frequency band shared by all the clusters, and allocating a user having a second largest throughput to a frequency band shared by some clusters.

According to a third aspect of the embodiments of the present invention, a communications device for executing the foregoing cell clustering method is provided.

Compared with the prior art, the cell clustering method and the spectrum overlapping multiplexing method based on the cell clustering method that are provided in the present invention take both throughputs and the user fairness into consideration and can improve the cell system average spectral efficiency and the cell edge spectral efficiency in an ultra dense network.

BRIEF DESCRIPTION OF THE DRAWINGS

FIG. 3 is a schematic diagram of allocating a user having a large throughput and a user having a small throughput to different parts of a spectrum according to the second embodiment of the present invention;

FIG. 4 is a schematic flowchart according to a third embodiment of the present invention;

FIG. 5 is a schematic diagram of spectrum allocation according to a fourth embodiment of the present invention;

DETAILED DESCRIPTION

The technical content of the present invention is specifically described in detail below with reference to the accompanying drawings and specific embodiments.

The present invention provides a spectrum overlapping multiplexing method based on cell clustering specific to technical features of an ultra dense network. The method includes first clustering small cells in an ultra dense network and then performing spectrum overlapping, and can achieve two technical effects, that is, increase in a system capacity and effective improvement of a coverage index, and is a preferred solution of optimization of a wireless communications network. A cell clustering method (a CCTI method for short) and a spectrum overlapping multiplexing method based on the cell clustering method that are provided in the present invention are especially adapted to be applied to a networking scenario of an ultra dense network. An overall idea lies in using different frequency allocation solutions for a user having a large throughput and a user having a small throughput between clusters, so as to improve a system capacity.

In the spectrum overlapping multiplexing method provided in the present invention, spectrum overlapping multiplexing may be performed based on an existing CCIR method, or may be performed based on the cell clustering method (a CCTI method for short) provided in the present invention. Therefore, two frequency overlapping methods are obtained: a spectrum overlapping interference reduction frequency planning method (Frequency Overlapping Based on the Interference Reduction, an FOIR method for short) and a spectrum overlapping throughput improvement frequency planning method (Frequency Overlapping based on the Throughput Improvement, an FOTI method for short). Detailed and specific descriptions are provided below.

Figure 1:
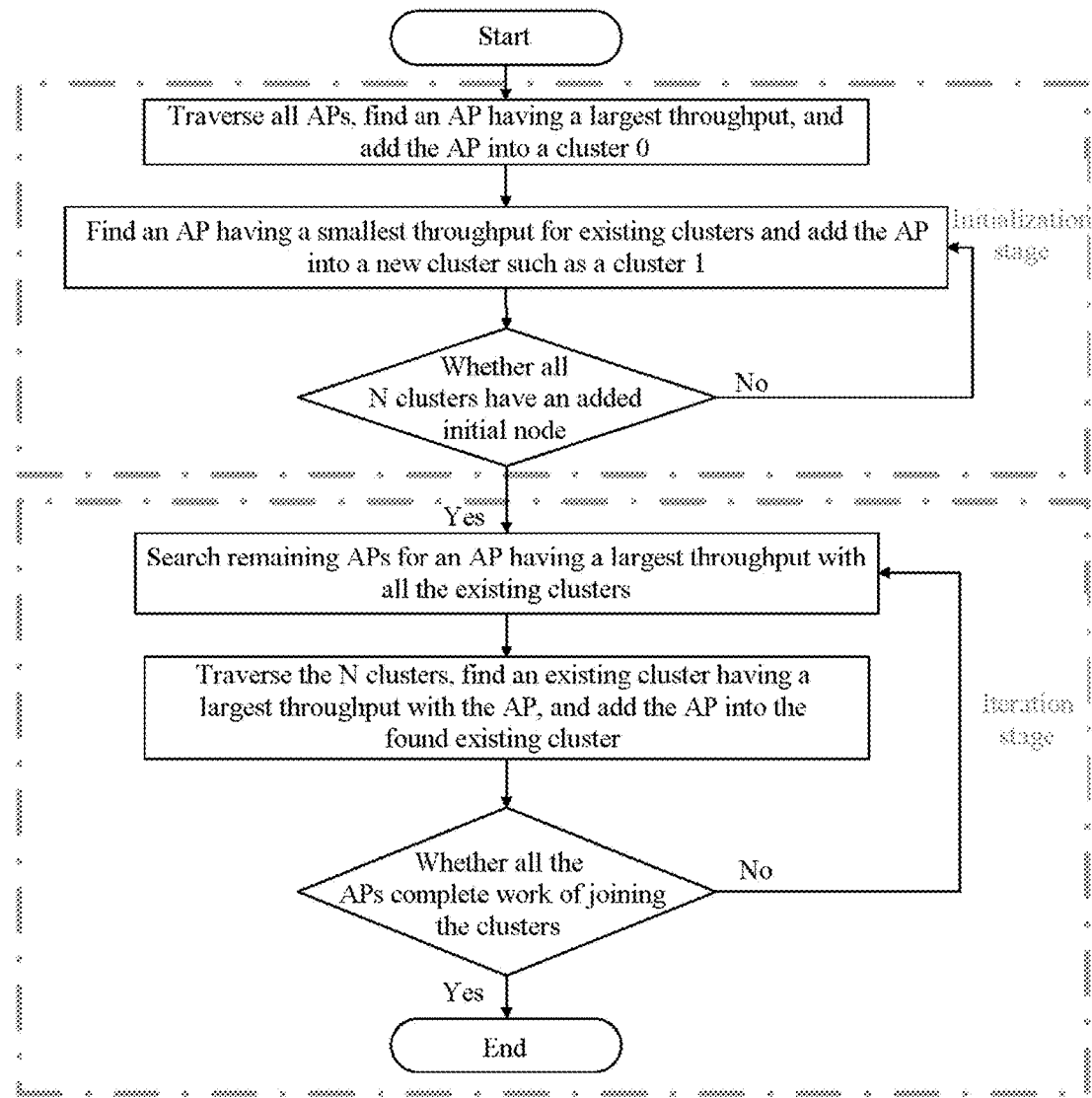
FIG. 1 is a flowchart of clustering by using a CCTI method according to a first embodiment of the present invention.

As shown in FIG. 1, main steps of the present invention include: classifying all small cells in a virtual cell into multiple clusters (classifying the small cells into two clusters is used as an example for description in FIG. 1); setting a ratio of frequencies that the clusters can use in an overlapping manner, that is, a frequency overlapping ratio; then setting an interference threshold, determining a user having a large throughput and a user having a small throughput, and finally, allocating users in each cluster to a frequency overlapping part or nonoverlapping part according to throughput values of the users.

First Embodiment

The first embodiment is described in detail below with reference to FIG. 1.

Step 1: Cluster small cells.

In this step, all small cells in a virtual cell are classified into different clusters.

First, the quantity of clusters into which the small cells are classified is obtained. In this embodiment, the optimal quantity of clusters in a CCIR method or a CCTI method is determined by means of simulation according to the CCIR method or the CCTI method (which is described in detail thereafter) that is provided in the present invention.

The optimal quantity of clusters in the present invention is the optimal quantity of clusters achieved by comparing a system capacity with coverage performance when the small cells are classified into various quantities of clusters. In other words, when the small cells are classified into the optimal quantity of clusters, the obtained comprehensive performance of a system capacity and coverage performance is the best. The optimal quantity of clusters is obtained in this way: first, it is assumed that the small cells are classified into N (N being a positive integer, the same below) of clusters, then a system capacity and coverage performance are calculated by simulation under different values of N, the two performance indexes are compared under different values of N, and the quantity N of clusters corresponding to a group of optimal performance is the optimal quantity of clusters. Being optimal is that the coverage performance and the system capacity are both improved, and the two indexes both become optimal. When the coverage performance and the system capacity do not both become optimal, the quantity of clusters corresponding to a group of performance indexes in which the coverage performance is optimal and the system capacity is second optimal is selected.

It is assumed that it is obtained by simulation or a testing instrument that the optimal quantity of clusters obtained according to the CCTI method is two. In this embodiment, an example of two clusters (that is, the quantity N of clusters=2) is used for description. Frequencies used by the two clusters are not completely different, and the two clusters may perform overlapping multiplexing on part of the frequencies, so that a user having a good throughput uses part of overlapping frequencies, thereby improving the spectrum utilization.

Second, after the quantity of clusters is determined, all the small cells in the virtual cell are allocated into the clusters. In this embodiment, all the small cells are allocated to two clusters.

A process of obtaining the optimal quantity of clusters according to the CCTI method provided in the present invention is described in detail below with reference to FIG. 1.

The CCTI method is an improved method based on an existing CCIR method. Not only interference between cells is considered, but also user level information is added as one piece of new signaling and is used as a determining basis. Optimized clustering is performed, and a capacity formula is used to estimate a throughput, and a user throughput is used as an improvement target.

A target of the CCTI method is to make throughputs of all clusters largest after small cells are added into the clusters. A main idea is that first the quantity N of clusters is determined, then a small cell having a largest throughput with other small cells is used to initialize a first cluster, and then (N−1) small cells having a smallest throughput with existing clusters are found in sequence to complete initialization; then a small cell having a largest throughput with the existing clusters is found and is added into a cluster having a largest throughput with the small cell; iteration is performed until all the small cells are all added into the N clusters. Specific steps are as follows:

1. Initialization stage: Initialize N target clusters. In other words, based on throughputs, a small cell that is interfered to a smallest extent is placed into a first cluster, and then (N−1) small cells that are interfered by existing clusters to a largest extent are respectively placed into (N−1) clusters to initialize the clusters.

11) Traverse all small cells, and find a small cell having a largest throughput according to user level information and add the small cell into a cluster 0.

In the CCTI method provided in the present invention, the user level information is sent by a micro cell to a macro cell by using a PDSCH channel (physical downlink control channel). The information includes micro cell transmit power (eight bits), micro cell noise (eight bits, to which an one-bit efficacy bit may be added), a user assigned bandwidth (eight bits), a user fairness coefficient (eight bits), a user channel gain (eight bits, to which an one-bit efficacy bit may also be added), and the like.

The user level information is event-triggered. After a user is arranged during initialization and a user location is determined, a message may be triggered to be sent. Subsequently, if the user moves or switches, the message is triggered to be sent after switching of the user location is completed. That is, a change of a user geographic location triggers transmission of the message.

The macro cell receives the user level information and finds a small cell having a largest throughput according to the following calculation formula of a micro cell (small cell) throughput:

$$R_k = \sum_{i=1}^{N_{UE}} \alpha_i \times B_i \log_2\left(1 + \frac{P_k H_{k,i}}{\sum_{j \neq k}^{N_{Cell}} P_j H_{j,i} + \sigma^2}\right) \quad (2)$$

$R_k$ is throughputs of all users in a small cell k, $N_{UE}$ is the quantity of users in each small cell, and $N_{Cell}$ is the quantity of interference small cells; in addition, fairness of each user is considered, $\alpha_i$ is a fairness coefficient corresponding to each user; $B_i$ is a bandwidth allocated to each user, $P_k$ is transmit power of the small cell k, H is a channel gain, and $\sigma^2$ is noise.

In the formula 2, a capacity formula is used to estimate throughputs, user level related information is added as a determining basis, and the throughput is used as an improvement target. This is more accurate than only considering cell level interference (formula 1).

It is assumed herein that the small cell $Cell_K$ is a small cell having a largest throughput, and $Cell_K$ is placed into a cluster 0.

12) Traverse existing clusters, use the existing clusters as interference cells, and find a corresponding small cell Celln having a smallest throughput for each cluster, where n=1, . . . , N.

The cluster 0 is used as an interference cell. That is, the small cell $Cell_K$ (where k∈n and K≠N) is used as an interference cell, and a small cell having a smallest throughput is found for all existing clusters (the cluster 0 in this embodiment). It is assumed that a corresponding small cell having a smallest throughput is found for the cluster 0 (the small cell $Cell_K$). That is, $Cell_K$ is used as an interference cell, and a small cell (which is assumed to be $Cell_{K+1}$) having a smallest throughput is found.

13) Search the n small cells for a small cell Cellmin having a smallest throughput.

In this embodiment, only the cluster 0 corresponds to a small cell $Cell_{K+1}$ having a smallest throughput. Therefore, $Cell_{K+1}$ is used as the small cell Cellmin having a smallest throughput in all the small cells.

14) Add Cellmin into a new cluster, for example, a cluster 1. The steps are repeated until all the N clusters have an added small cell.

Because the small cell $Cell_{K+1}$ is the small cell Cellmin having a smallest throughput, $Cell_{K+1}$ is added into the cluster 1. In this way, all the clusters (which are the cluster 0 and the cluster 1 in this embodiment) have an added small cell, and the next step is entered.

2. Iteration stage: Add a small cell having a largest throughput with the existing clusters into a corresponding cluster, where the small cell has a largest throughput with the cluster. In other words, small cells that are interfered by the clusters to a smallest extent are respectively into the clusters, and the step is repeated until all the small cells are allocated into the clusters.

21) Traverse the N clusters, and search remaining small cells for a small cell $Cell_{max}$ having a largest throughput with all the clusters.

In the foregoing steps, the small cells $Cell_K$ and $Cell_{K+1}$ are respectively allocated into the cluster 0 and the cluster 1. Specific to the remaining small cells, throughputs of $Cell_1$, $Cell_2$, $Cell_3$, . . . , $Cell_{K-1}$, $Cell_{K+2}$, . . . , $Cell_N$ are respectively calculated by using the cluster 0 and the cluster 1 as interference cells.

In this embodiment, calculating a throughput of $Cell_1$ with the cluster 0 ($Cell_K$) is calculating a throughput $R_{10}$ of $Cell_1$ according to the formula 2 by using $Cell_K$ as an interference cell. Similarly, calculating a throughput of $Cell_1$ with the cluster 1 ($Cell_{K+1}$) is calculating a throughput R11 of $Cell_1$ according to the formula 2 by using $Cell_{K+1}$ as an interference cell.

Similarly, a throughput $R_{20}$ of $Cell_2$ with the cluster 0 ($Cell_K$) and a throughput $R_{21}$ of $Cell_1$ with the cluster 1 ($Cell_{K+1}$) are calculated.

In this way, throughputs $R_{10}$, $R_{11}$, $R_{20}$, $R_{21}$, $R_{N0}$, and $R_{N1}$ of all the small cells separately with all the clusters are obtained by calculation. These throughputs are searched for a largest one, and herein, the largest one is assumed to be $R_{20}$. Because $R_{20}$ is the largest throughput, a corresponding small cell having a largest throughput is $Cell_2$ and is used as $Cell_{max}$.

22) Find a corresponding existing cluster having a largest throughput with $Cell_{max}$ and use the cluster as a cluster $C_i$ having a largest throughput.

Because throughputs with all the clusters are learned in the foregoing steps, in this step, $R_{20}$ may be selected as the largest throughput, a corresponding small cell is $Cell_2$, and a corresponding cluster is the cluster 0. That is, the cluster $C_i$ having a largest throughput is the cluster 0.

23) Add the small cell $Cell_{max}$ into the cluster $C_i$.

Therefore, a small cell corresponding to the largest throughput is added into a corresponding cluster. In this embodiment, the largest throughput is $R_{20}$, a corresponding small cell is $Cell_2$, and a corresponding cluster is the cluster 0. Therefore, $Cell_2$ is used as $Cell_{max}$ and is added into the cluster 0 (the cluster $C_i$).

24) Traverse all the remaining small cells, and repeat step 21 to step 23 until all the small cells are added into the N clusters.

Step 21 to step 23 are repeated, and the small cells are respectively added into all the clusters according to throughputs.

In the present invention, a user level throughput or capacity is used as input information for clustering decision, and the small cells are allocated into corresponding clusters by using a principle of a largest throughput. That is, a throughput is used as an optimization target, and user fairness is also considered.

In addition, in the present invention, user channel information is added, so that a macro cell collects from a micro cell information required for calculation of throughputs, the throughputs are calculated according to the formula 2, and optimized clustering is performed by using the throughputs as a determining basis, so as to perform clustering planning more accurately and improve both a capacity and a coverage performance index.

Second Embodiment

After cell clustering is performed by using the CCTI method provided in the present invention based on the throughput (SINR) and fairness, based on a clustering result, LTE fairness scheduling, soft switching, and the like may be performed, or multiple solutions such as spectrum multiplexing may be performed.

For example, in a method for performing user scheduling after cell clustering is performed based on throughputs, after cell clustering is performed based on throughputs, micro cells may respectively schedule users within the micro cells according to a proportional fairness rule. Alternatively, scheduling may be performed in a manner such as polling or a largest carrier-to-interference ratio.

Figure 2:
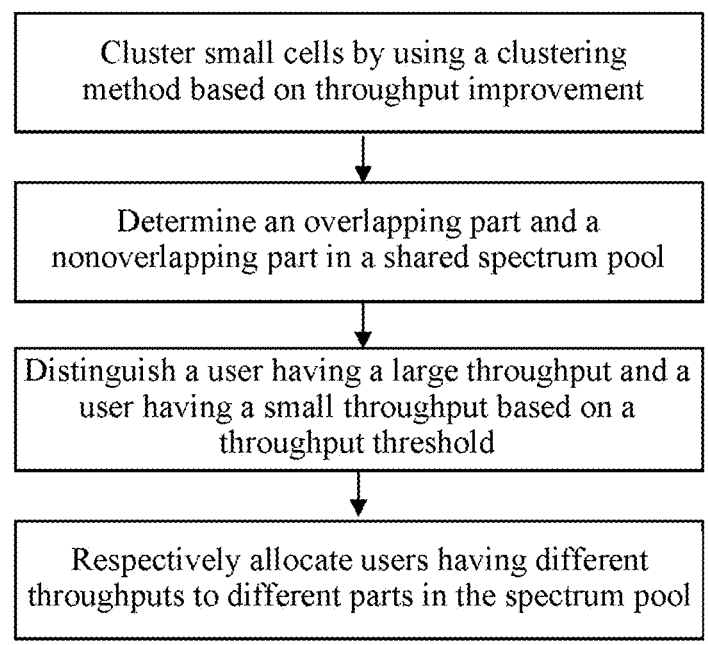
FIG. 2 is a flowchart of a spectrum overlapping multiplexing method based on cell clustering according to a second embodiment of the present invention.

In the second embodiment, a spectrum overlapping multiplexing method after cell clustering is performed based on throughputs is introduced with reference to FIG. 2 and FIG. 3. The method includes the following steps:

determining an overlapping part and a nonoverlapping part in a spectrum capable of being used by small cells in clusters; and determining a user having a large interference and a user having a small interference in the small cells, and allocating the user having a large interference to the nonoverlapping part.

The user having a large interference is a user having a small throughput in the small cells; the user having a small interference is a user having a large throughput in the small cells.

After cell clustering is performed based on the CCTI method provided in the present invention (the step is the same as that in the first embodiment and details are not described herein again), frequencies used by the small cells in the clusters have an overlapping multiplexing part.

First, the overlapping part and the nonoverlapping part in the spectrum used by the small cells in the clusters are determined. As shown in FIG. 3, a middle frequency band (which is dark in FIG. 3) is a shared frequency band, that is, the overlapping part. Frequency bands on two sides are frequency bands separately used by two clusters, that is, the nonoverlapping part.

Secondly, the user having a large throughput and the user having a small throughput are determined.

In this embodiment, the user having a large throughput and the user having a small throughput are determined by setting an interference threshold for determining a good throughput or a poor throughput. A user having a throughput lower than the interference threshold is the user having a small throughput. A user having a throughput greater than the interference threshold is the user having a large throughput.

Thirdly, a user having a large throughput and a user having a small throughput in a same cluster are respectively allocated to frequency bands of different parts of the spectrum.

Referring to FIG. 3, users having different throughputs are allocated to different parts in a spectrum pool, and the spectrum pool is shared by small cells in different clusters. An allocation rule is: The user having a small throughput uses a frequency band of the nonoverlapping part, and the user having a large throughput uses a frequency band of the overlapping part or all frequency bands.

In this embodiment, the optimal quantity of clusters is 2. Therefore, the spectrum pool is divided into three parts: a spectrum part separately used by small cells in a first cluster; a spectrum part separately used by small cells in a second cluster; and a spectrum part shared by the small cells in the two clusters. The former two spectrum parts that are separately used are defined in a unified manner as: the nonoverlapping part. Correspondingly, the spectrum part shared by the small cells in the two clusters is defined as: the overlapping part.

The user having a throughput greater than the interference threshold is the user having a large throughput. Because the user is seldom affected by other small cells, the user may use a frequency overlapping part in the two clusters, and may use an entire frequency band that can be used by small cells in the cluster in which the user is.

Using FIG. 3 as an example, in users in small cells in a cluster A, a user having a large throughput may use a left frequency band (a left white area, a nonoverlapping part) and a middle shared frequency band (a dark area, an overlapping part) in FIG. 3. That is, the user having a large throughput in the small cells in the cluster A may use all frequency bands that can be used by the small cells in the cluster A. In the users in the small cells in the cluster A, a user having a small throughput is allocated to the frequency band (the left white area) separately used by the small cells in the cluster A shown in FIG. 3.

Similarly, in users in small cells in a cluster B, a user having a large throughput may use a frequency band (a right white area, a nonoverlapping part) separately used by the small cells in the cluster B and a middle shared frequency band (a dark area, an overlapping part). That is, the user having a large throughput in the small cells in the cluster B may use all frequency bands that can be used by the small cells in the cluster B. In the users in the small cells in the cluster B, a user having a small throughput is allocated to the frequency band (the right white area) separately used by the small cells in the cluster B shown in FIG. 3.

Third Embodiment

The third embodiment differs from the first embodiment in that the optimal quantity of clusters is obtained according to an existing CCIR method, and different users are distinguished based on magnitudes of signal and interference to noise ratios (SINRs) and are allocated to the overlapping or nonoverlapping part in the spectrum. The method includes the following steps:

determining a frequency band of an overlapping part and a frequency band of a nonoverlapping part in a spectrum capable of being used by small cells in clusters; and determining a user having a large interference and a user having a small interference in the small cells, and allocating the user having a large interference to the nonoverlapping part.

The user having a large interference is a user having a poor SINR in the small cells; the user having a small interference is a user having a high SINR in the small cells.

Referring to FIG. 4, first, the optimal quantity of clusters is obtained according to the existing CCIR method, and the optimal quantity of clusters is 2 in this embodiment.

Secondly, an overlapping part and a nonoverlapping part in a spectrum in a spectrum pool of two clusters are determined.

Then an interference threshold (that is, an SINR threshold) is set to distinguish s user having a high SINR and a user having a poor SINR in each small cell.

Finally, in users in small cells in each cluster, a user having a poor SINR is preferentially allocated to a frequency band of a nonoverlapping part occupied by the cluster; a user having a high SINR is preferentially allocated to a frequency band shared by two clusters, and not only may be allocated to the frequency band of the nonoverlapping part separately occupied by the cluster but also may be allocated to a frequency band of an overlapping part shared by the cluster and other clusters. That is, the user having a high SINR may be allocated to all frequency bands that may be used by a cluster in which the user having a high SINR is located.

Fourth Embodiment

Different from the second embodiment or the third embodiment, the fourth embodiment discusses a case in which the quantity N of clusters is greater than 2.

First, cells are clustered based on a CCIR method and a CCTI method, and the quantity of clusters is greater than 2, for example, 3.

Secondly, a spectrum pool shared by small cells in three clusters is divided into seven parts shown in FIG. 5. Three frequency bands marked with A/B/C are respectively frequency bands separately used by the cluster A, the cluster B, and the cluster C, that is, the nonoverlapping part. A frequency band marked with A+B is a frequency band shared by the cluster A and the cluster B and cannot be used by the cluster C; a frequency band marked with A+C is a frequency band shared by the cluster A and the cluster C and cannot be used by the cluster B; a frequency band marked with B+C is a frequency band shared by the cluster B and the cluster C and cannot be used by the cluster A. A frequency band marked with A+B+C is a frequency band shared by the cluster A, the cluster B, and the cluster C.

Thirdly, users in the small cells in the clusters are allocated to a spectrum pool shared by all clusters. An allocation rule is: Each cluster allocates a user having a small throughput in the cluster to a frequency band of the nonoverlapping part, and other users in the cell may use all frequency bands that can be used by the cluster.

Specifically, with reference to FIG. 5, in users in small cells in the cluster A, a user having a large throughput is allocated to the A+B/A+C/A+B+C frequency band or the A frequency band (that is, all frequency bands that can be used by the cluster A), and a user having a small throughput is allocated to the A frequency band. Preferably, a user having a highest throughput is allocated to the A+B+C frequency band (a frequency band shared by all clusters), and a user having the second highest throughput is allocated to the A+B or A+C frequency band (a frequency band shared by some clusters).

Technical effects of the present invention are introduced below by using simulation data. Key simulation parameters are shown in the following table 1:

TABLE 1

| | Setting of simulation parameters | |
|---|---|---|
| | Macro Cell | Small Cell |
| Layout | A honeycomb mesh, one macro base station, three sectors in each macro base station | 37 small cells in each sector and uniformly distributed in the honeycomb mesh |
| System bandwidth | 35/20 MHz | 35/20 MHz |
| Quantity of frequency bands | — | 1 to 7 |
| Carrier frequency | 2.0 GHz | 3.5 GHz |
| BS transmit power | 46 dBm | 24 dBm |
| Channel model | ITU channel | |
| Road loss model | $128.1 + 37.6\log(R)$ Unit of R: km | $140.7 + 36.7\log(R)$ Unit of R: km |
| Penetration loss | 20 dB | |
| Shade standard deviation | 8 dB | 10 dB |

TABLE 1-continued

Setting of simulation parameters

| | Macro Cell | Small Cell |
|---|---|---|
| Antenna model | 3D directional antenna | 2D omnidirectional antenna |
| Antenna pattern | $A_H(\varphi) = -\min\left[12\left(\frac{\varphi}{\varphi_{3dB}}\right)^2, A_m\right]$ where $A_m = 20$, $\varphi_{3dB}$ and $= 70°$ | $A_H(\phi) = 0$ |
| Antenna gain | 8 dBi | 5 dBi |
| UE antenna gain | 0 dBi | |
| Antenna configuration | BS: 1Tx, UE: 2Rx | |
| UE release | A quantity of users in each micro cell is 5 | |
| Base station distance | 500 m | 20 m |
| Service model | Full Buffer | |

1. Simulation Result when Users are Distributed on Edges

An interference threshold for determining magnitudes of throughputs needs to be set in this embodiment of the present invention, and a unit thereof is dB. If a throughput of a user is greater than the interference threshold, it is determined that the user is a user having a large throughput, and the user can use all frequency bands of a virtual cell. If a throughput of a user is lower than the interference threshold, the user uses a frequency of a nonoverlapping part of frequencies belonging to the cluster. Therefore, theoretically, there is a most suitable value that makes the system performance best. A result of finding, by using multiple groups of simulation experiments, an optimal interference threshold for determining magnitudes of throughputs is shown below.

TABLE 2

Gains of spectrum efficiency of different interference thresholds

| | Spectrum efficiency (throughput) | |
|---|---|---|
| Interference threshold (dB) | System gain | Edge gain |
| 0 | — | — |
| 1 | 0.05% | 5.00% |
| 2 | 0.01% | −2.69% |

Table 2 shows system and edge performance gains when different interference thresholds use 0 dB as reference when a spectrum overlapping ratio is fixed. The system performance and the edge performance are relatively best when the interference threshold is 1 dB. Therefore, when the users are distributed on edges, during simulation, the interference threshold is set to 1 dB to obtain an optimal simulation result. In conclusion, the interference threshold 1 dB is an optimal value when the users are distributed on edges.

2. Simulation Result when Users are Uniformly Distributed.

Table 3 shows overall system performance and edge performance gains corresponding to different interference threshold simulations when the interference threshold 0 dB is used as reference when a spectrum overlapping ratio is fixed. Performance is better when the interference threshold is 2 dB, and during simulation, the interference threshold is set to 2 dB to obtain a better simulation effect. In conclusion, when the users in a small cell are uniformly distributed, the most suitable interference threshold is 2 dB.

TABLE 3

Gains of spectrum efficiency of different interference thresholds

| | Spectrum efficiency (throughput) | |
|---|---|---|
| Interference threshold (dB) | System gain | Edge gain |
| 0 | — | — |
| 1 | −0.07% | −1.38% |
| 2 | 0.09% | 0.00% |
| 3 | 0.20% | −31.03% |

Table 4 and Table 5 show corresponding gains of two spectrum overlapping multiplexing methods relative to the reference (non-clustering) spectrum efficiency. Besides, simulation results corresponding to an existing CCIR solution and a CCTI solution that is based on user level information and uses throughputs as an improvement target are listed in the tables for comparison and analysis. Related data shows that when two user distribution scenarios are separately considered, the four solutions have obvious gains compared with the reference (non-clustering). A performance gain of the CCTI method is better than that of CCIR, and that of an FOTI method is better than that of FOIR. It indicates that increase in user level information, consideration of throughputs as an improvement target, and consideration of user fairness for clustering have obvious advantages over only consideration of cell level interference. Similarly, the performance gain of the FOIR method is better than that of CCIR, and that of the FOTI method is better than that of CCTI. It indicates that setting of a spectrum overlapping ratio and use of the parameter, the interference threshold for determining magnitudes of throughputs, for performing the spectrum overlapping multiplexing method have obvious gain improvement.

TABLE 4

Gain comparison of four methods relative to baseline

| | User edge distribution | | User uniform distribution | |
|---|---|---|---|---|
| Spectrum planning | System gain | Edge gain | System gain | Edge gain |
| Non-clustering | — | — | — | — |
| CCIR method | 6.68% | −4.16% | −21.01% | 15.89% |
| CCTI method | 6.78% | 13.50% | −21.68% | 10.85% |

TABLE 4-continued

Gain comparison of four methods relative to baseline

| Spectrum planning | User edge distribution | | User uniform distribution | |
|---|---|---|---|---|
| | System gain | Edge gain | System gain | Edge gain |
| FOIR method | 6.44% | 0.89% | −15.10% | 06.98% |
| FOTI method | 30.5% | 34.18% | −4.14% | 33.02% |

TABLE 5

Gain comparison relative to clustering solution based on interference reduction

| Spectrum planning | User edge distribution | | User uniform distribution | |
|---|---|---|---|---|
| | System gain | Edge gain | System gain | Edge gain |
| CCIR method | — | — | — | — |
| CCTI method | 0.09% | 18.42% | −0.86% | −4.35% |
| FOIR method | −0.23% | 5.26% | 7.48% | −19.73% |
| FOTI method | 22.33% | 40% | 21.36% | 14.78% |

It can be known according to data in the tables that when the users are distributed on edges, a gain of the CCIR method is the smallest, and a system gain is 6.68%, but edge performance is slightly lowered by approximately 4%; a system gain of the FOIR method is the second smallest: 6.44%, and basically, edge performance is not improved. A system gain of the CCTI method is the third smallest: 6.78%, and an edge gain is 13.50%. The FOTI method has largest improvement, and either system performance or edge performance is improved by over 30%. When the users are uniformly distributed, system performances of three methods, CCIR, CCTI, and FOIR solutions, all dramatically decrease relative to the reference. Therefore, the three methods are not suitable to be used when the users are uniformly distributed. Only performance of the FOTI method (a spectrum overlapping multiplexing method for performing clustering based on the CCTI method) is dramatically improved. Although system performance decreases by approximately 4%, edge performance is improved by as high as 33%. The FOTI method is a method that is still effective when the users are uniformly distributed.

In conclusion, effects of the spectrum overlapping multiplexing method for clustering based on the throughput improvement (that is, the FOTI method) are optimal. In the method, coverage performance can be dramatically improved when the users are uniformly distributed, and capacity and coverage performance can both be improved when the users are distributed on edges.

In the present invention, user level throughputs are used as input information for clustering decision, the throughputs are used as an optimization target, and user fairness is considered, user level information is added as new signaling and is used as a determining basis for optimized clustering, and the cell system average spectrum efficiency and the cell edge spectrum efficiency in an ultra dense network may be improved by configuring a spectrum overlapping ratio and an interference threshold parameter that is used for determining magnitudes of throughputs, to implement balancing between throughputs and fairness.

Figure 6:
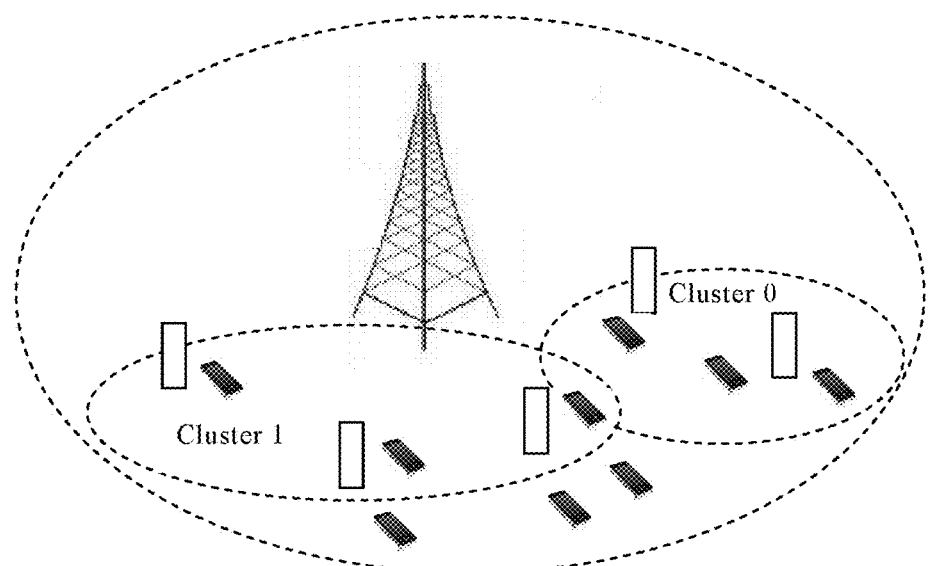
FIG. 6 is a schematic diagram of communication network that can apply the cell clustering and spectrum overlapping multiplexing method in the present invention.
Figure 7:
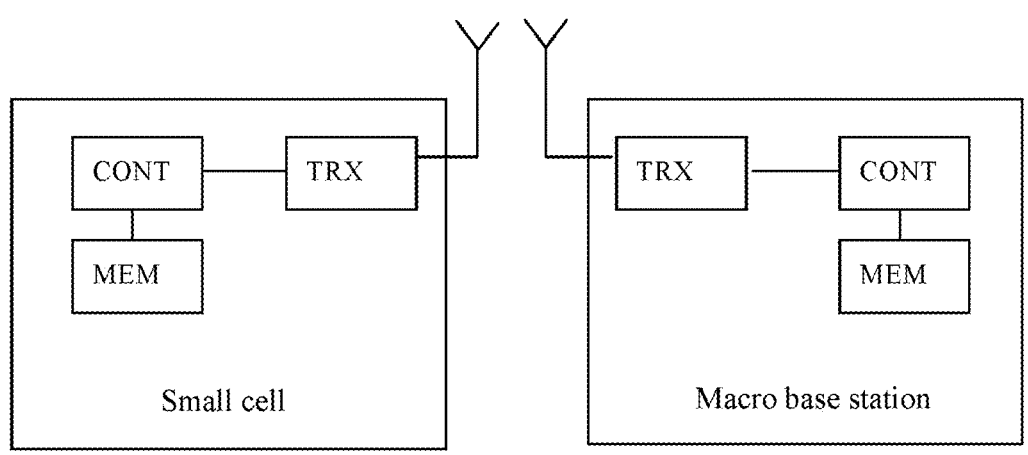
FIG. 7 is a schematic diagram of communication device that can apply the cell clustering and spectrum overlapping multiplexing method in the present invention.

A communications device that can apply the cell clustering and spectrum overlapping multiplexing method in the present invention such as a macro base station is introduced below with reference to FIG. 6 and FIG. 7. As shown in FIG. 6, multiple small cells are distributed in a macro cell of a macro base station, and each small cell corresponds to a micro cell. The macro base station includes at least one controller and at least one memory. A computer program instruction is stored in the memory and is used to cooperate with the controller to make the macro base station perform the following operations:

in an initialization stage, N target clusters are initialized; in other words, based on throughputs, a small cell that is interfered to a smallest extent is placed into a first cluster, and then (N−1) small cells that are interfered by existing clusters to a largest extent are respectively placed into multiple clusters to initialize the clusters; and in an iteration stage, a small cell having a largest throughput with the existing clusters is added into a corresponding cluster, where the small cell has a largest throughput with the cluster; in other words, small cells that are interfered by the clusters to a smallest extent are respectively added into the clusters, and the step is repeated until all the small cells are allocated into the clusters.

11) A controller traverses all small cells, finds a small cell having a largest throughput according to user level information, adds the small cell into a cluster 0, and stores the cluster 0 in a memory.

12) The controller traverses existing clusters in the memory, uses the existing clusters as interference cells, and finds a corresponding small cell Celln having a smallest throughput for each cluster, where n=1, . . . , N.

13) The controller searches the n small cells for a small cell Cellmin having a smallest throughput.

14) The controller adds Cellmin into a new cluster, for example, a cluster 1. The steps are repeated until all N target clusters have an added small cell.

21) The controller traverses the N clusters, and searches remaining small cells for a small cell $Cell_{max}$ having a largest throughput with all the clusters.

22) The controller finds a corresponding existing cluster having a largest throughput with $Cell_{max}$ and uses the cluster as a cluster $C_i$ having a largest throughput.

23) The controller adds the small cell $Cell_{max}$ into the cluster $C_i$ and stores the cluster $C_i$ in the memory.

24) The controller traverses all the remaining small cells, and repeats step 21 to step 23 until all the small cells are added into the N clusters.

After clustering the cells according to the foregoing steps, the macro base station may also implement spectrum overlapping multiplexing based on cell clustering based on throughputs. A computer program instruction is stored in the memory of the macro base station and is used to cooperate with the controller to make the macro base station perform the following spectrum overlapping multiplexing operations.

The controller determines an overlapping part and a nonoverlapping part in a spectrum capable of being used by small cells in clusters.

The controller determines a user having a large interference and a user having a small interference in the small cells, and allocates the user having a large interference to the nonoverlapping part. The user having a large interference is a user having a small throughput in the small cells; the user having a small interference is a user having a large throughput in the small cells.

Thirdly, the controller respectively allocates a user having a large throughput and a user having a small throughput in a same cluster to different parts of the spectrum.

The cell clustering method, the spectrum overlapping multiplexing method based on the method, and the device thereof that are provided in the present invention are described in detail above. For a person of ordinary skill in the art, any obvious change made under the premise of not departing from the substantial spirit of the present invention shall construct violation to the patent right of the present invention and bear a corresponding legal responsibility.

What is claimed is:

1. A cell clustering method, used to cluster multiple small cells into N clusters, wherein the method comprises the following steps:

traversing all the small cells to find a first small cell having a first largest throughput among all the small cells, and allocate the first small cell into a first cluster of the N clusters; and traversing the small cells to find a second small cell having a smallest throughput with the clusters having been allocated one of the small cells among all the small cells, and allocating the small cell into a second cluster of the cluster;

traversing the small cells to find a Nth small cell having a smallest throughput with the clusters having been allocated one of the small cells among all the small cells, until each of the N clusters has been allocated one of the small cells, wherein N is a positive integer.

2. The cell clustering method according to claim 1, wherein the smallest or largest throughput is obtained by calculation according to a user level information; and the user level information comprises micro cell transmit power, micro cell noise, a user assigned bandwidth, a user fairness coefficient, and a user channel gain.

3. The cell clustering method according to claim 2, wherein the user level information is sent by a micro cell to a macro cell by using a physical downlink control channel.

4. The cell clustering method according to claim 2, wherein the user level information is triggered when a user geographic location changes.

5. The cell clustering method according to claim 1, further comprising comprises the following steps:

searching remaining small cells, to calculate throughputs of the small cells by using the N clusters as interference cells;

searching each of the remaining small cells and corresponding cluster, the small cell having a second largest throughput with the corresponding cluster;

adding the each of the remaining small cells into the corresponding cluster; and repeating the foregoing steps until all the small cells are individually added into the N clusters.

6. A spectrum overlapping multiplexing method based on a cell clustering method, wherein the method comprises the following steps:

placing a first small cell that is interfered to a first smallest throughput into a first cluster, and then respectively placing (N−1) small cells that are interfered by existing clusters to a largest throughput into (N−1) clusters to initialize the N clusters;

adding a second small cell that is interfered by the clusters to a smallest throughput into the clusters, and repeating the step until all small cells are allocated into the clusters, wherein N is a positive integer;

determining an overlapping part and a nonoverlapping part in a spectrum capable of being used by the small cells in the clusters;

determining a user having a large interference and a user having a small interference in the small cells; and allocating the user having a large interference to the nonoverlapping part.

7. The spectrum overlapping multiplexing method according to claim 6, wherein the method comprises the following steps:

the user having a large interference being a user having a small throughput in the small cells;

the user having a small interference being a user having a large throughput in the small cells; and allocating the user having a small throughput to the nonoverlapping part.

8. The spectrum overlapping multiplexing method according to claim 6, wherein the method comprises the following steps:

the user having a large interference being a user having a poor SINR in the small cells;

the user having a small interference being a user having a high SINR in the small cells; and allocating the user having a poor SINR to the nonoverlapping part.

9. The spectrum overlapping multiplexing method according to claim 6, wherein the method further comprises the following step:

allocating the user having a small interference to the overlapping part.

10. A communications device, comprising at least one controller and at least one memory, wherein the memory comprises a computer program, used to make the communications device perform the following operations under an instruction of the controller:

traversing all the small cells to find a first small cell having a first largest throughput among all the small cells, and allocate the first small cell into a first cluster of the N clusters; and traversing the small cells to find a second small cell having a smallest throughput with the clusters having been allocated one of the small cells among all the small cells, and allocating the small cell into a second cluster of the cluster;

traversing the small cells to find a Nth small cell having a smallest throughput with the clusters having been allocated one of the small cells among all the small cells, until each of the N clusters has been allocated one of the small cells, wherein N is a positive integer.

11. The communications device according to claim 10, wherein the smallest or largest throughput is obtained by calculation by the controller according to a user level information; and the user level information comprises micro cell transmit power, micro cell noise, a user assigned bandwidth, a user fairness coefficient, and a user channel gain.

12. The communications device according to claim 10, wherein the memory and the computer program are used to coordinate with the controller, to make the communications device perform the following operations:

determining an overlapping part and a nonoverlapping part in a spectrum capable of being used by the small cells in the clusters;

determining a user having a large interference and a user having a small interference in the small cells; and allocating the user having a large interference to the nonoverlapping part.

13. The communications device according to claim 12, wherein the memory and the computer program are used to coordinate with the controller, to make the communications device perform the following operations:

allocating the user having a small interference to the overlapping part.

* * * * *